May 3, 1960 I. B. PHILLIPS 2,935,387
COMPACTING PROCESS FOR PRODUCING A GRANULAR PRODUCT
Filed May 31, 1957
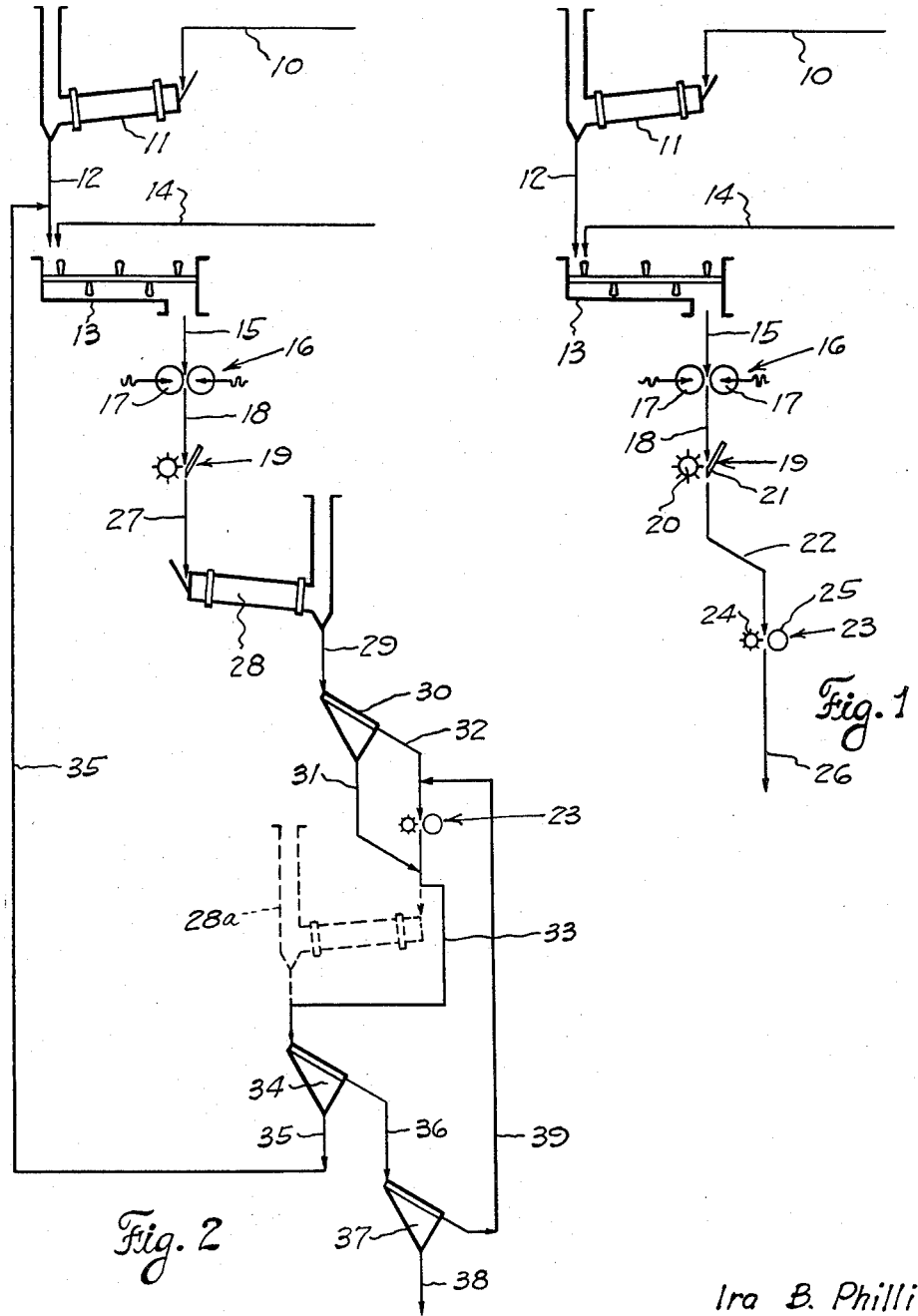
Ira B. Phillips
INVENTOR.
BY Vincent Martin
Joe E. Edwards
M. Harvey Jay ATTORNEYS United States Patent Office 2,935,387
Patented May 3, 1960

2,935,387

COMPACTING PROCESS FOR PRODUCING A GRANULAR PRODUCT

Ira B. Phillips, Carlsbad, N. Mex., assignor to Duval Sulphur & Potash Company, Houston, Tex., a corporation of Texas Application May 31, 1957, Serial No. 662,828

9 Claims. (Cl. 23—313)

This invention relates to new and useful improvements in a compacting process for producing a granular product.

The invention relates particularly to a compacting process for efficiently converting fine particles of fertilizer salts, such as muriate of potash, into a suitable size granular product.

In the conventional production of fertilizer salts, such as potash for the fertilizer industry, the fine potash particles inherent in the usual methods of production are extremely objectionable. These so-called fines not only cause serious dust problems in storage, handling and application, with resultant loss of material, but also aggravate caking problems by magnifying the hygroscopisity of the material due to their high surface-to-weight ratio. Various granulating processes have been employed to convert these fines into a coarser, more desirable size and usually such processes have been of strictly mechanical nature with the result that it has been difficult to consistently obtain the desired granular product.

It is one object of this invention to provide an improved process converting fine particles into a granular or coarse product of desired size; the process being economical in operation and consistent in its production of a granular product of superior physical quality.

An important object is to provide an improved process for producing a granular product from fine particles of potash, wherein moisture is added to the fine particles, prior to a compacting step, by admixing with said particles a brine saturated with the soluble constituents of the solid feed; said brine producing a better bonding action than water and having other advantages over water by reason of its higher boiling point.

A particular object is to provide an improved process, of the character described, wherein the solid-liquid feed mixture is heated to a predetermined degree and is introduced into the compactor in such heated state; the heating of the mixture improving the quality of the sheet or ribbon of material produced in the compactor, whereby accurate control of the size of the granular product produced by the process may be maintained.

A further object is to provide a process of the character described in which the flaked product may be subjected to heat curing prior to final crushing to improve the flake; also the process contemplates the screening of the material at various stages to remove all fines from the system.

Still another object is to carry out a process for the production of a granular product in a closed system and continuous manner.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

Figure 1 is a flow diagram illustrating the process for producing a granular product in accordance with the invention, and Figure 2 is a similar diagram illustrating a modification of the process, wherein heating and screening steps may be employed at various stages in said process.

The improved process and apparatus will be described herein as compacting muriate of potash, but it is pointed out that the process would be applicable to other salts or materials wherein it is desired to convert fine particles into a granular product.

In the drawings (Figure 1), the numeral 10 designates a feed inlet line through which the particles of muriate of potash are conducted to the system. The particles are suitably heated to a relatively high temperature and as illustrated, a drier 11 of usual construction may be employed for this purpose. The particles are conducted from the drier through an outlet 12 to a suitable mixer 13. A predetermined volume of liquid, which is preferably a brine saturated with the soluble constituents of the solid feed, is introduced into the mixer through a conductor 14. The mixer 13 functions to thoroughly admix the solid feed and the liquid or brine, such admixture being accomplished as the feed and brine move from the inlet side of the paddle mixer to the outlet end thereof.

The solids and liquid, which are homogeneously mixed within the mixer 13, are discharged through a line 15 to a compactor 16. The compactor, which is schematically illustrated, includes substantially cylindrical rolls 17, which are urged toward each other under desired pressures. The material is fed into the area between the compactor rolls 17 and is pressed to form a ribbon or sheet of the material. The sheet or ribbon of material indicated at 18 is then fed to a flake breaker 19 which may be of any desired construction and which forms the material into desired flakes. The flake breaker consists of a flaking roller 20 operating in relation to an inclined trough or plate 21.

The broken flakes from the flake breaker are conducted through the line 22 to a rolls crusher generally indicated at 23. The crusher may be of standard construction and includes one or more pairs of opposed corrugated rolls 24 and 25. The corrugations of the roll 24 extend longitudinally while the corrugations of the roll 25 are disposed circumferentially and the crushing characteristics of the machine are determined by the gap between the rolls and the number of corrugations to the inch. The crushed material, which is of the desired size, produces a granular material which is discharged through the conductor 26. The product so produced may be taken to storage or otherwise disposed of.

In the practice of the method as above described, it has been discovered that the quality of the sheet or ribbon of material 18, which is produced in the compactor 16, must be such that the flake breaker and the rolls crusher will ultimately form the desired granular product. If this sheet or ribbon of material 18 is not maintained of a constant quality, than a proper size granular product will not be produced. In other words, the softness or hardness of the sheet 18 enters into the type of final product.

In order to control the quality of the sheet of material produced by the compactor, the temperature of the liquid-solid feed mixture, which is conducted to the compactor through the mixer discharge 15, must be of a temperature equal to at least 200 degrees F.; or generally speaking, above the boiling point of water at the particular altitude; actually, practice has shown that efficient control of the quality of the sheet 18 produced by the compactor may be accomplished by maintaining the temperature of the liquid-solid feed mixture within the range of 200 degrees to 280 degrees. If the temperature of this mixture is less than 200 degrees, the quality of the sheet 18 produced by the compactor is inconsistent and difficulty is experienced in producing the proper granular product.

The drier 11 or other heating means applies heat to the solid feed and elevates its temperature to a point which will assure that the temperature of the liquid-solid feed mixture passing to the compactor 16 will be above the minimum temperature requirement. It is, of course, evident that suitable insulation around the line 12 and mixer 13 may be employed to reduce the heat requirements.

Since the solid feed material is introduced into the mixer at an elevated temperature, the addition of moisture through the line 14 would tend to create a steam problem. However, by employing brine, which has a higher boiling point than water, less steam is produced in the mixing step. Furthermore, the brine bonds the material much better than water, producing a much harder cake which will decrease the possibility of undesirable fine fractions being produced in passing through the roller mills. Actual tests show that the proper sheet quality and hardness can be obtained where the liquid-solid mixture being directed to the compactor has between .1 and 2.0% moisture content.

The process produces a final granular product which is firm, hard and of low porosity and such product is produced from the undesirable fines with maximum recovery of the desired mesh fractions. The advantages of such a granular product, as compared to the extremely fine particles from which it is produced, in storage, handling and application, are obvious.

In Figure 2, a modified arrangement of the process is illustrated. Referring to this figure, the solid feed is introduced through line 10, passes through drier 11, and is conducted through line 12 to the mixer 13, and moisture is added, preferably in the form of brine through the conductor 14.

The liquid-solid mixture is conducted to the compactor 16, through line 15, and the sheet or ribbon of material 18 is passed through the flake breaker 19. Up to this point the process of Figure 2 is the same as that heretofore described with respect to Figure 1.

Upon leaving the flake breaker, the material is conducted through line 27 to a drier 28 wherein the flake discharged from the breaker 19 can be hardened and thus improved by heat curing. This heat curing step is accomplished by a normal drying operation in which the heat is at a temperature above 200 degrees F.

The flake discharges from the drier 28 through a line 29 and is passed through a suitable screen 30 which separates any fine particles which might have been formed in the flaking operation. The separated fines bypass the rolls crusher 23 through a line 31 while the flake material is conducted from the screen 30 through a conductor 32. The discharge line 33 extending from the rolls crusher 23 may then be passed through another screen 34 wherein additional fines are separated and carried off through line 35. These fines are conducted back to the inlet line 12 through the conductor 35 and are passed back through the system. The coarse particles from the screen 34 are conducted through line 36 to a third screen 37 and the final granular product is discharged from the system through outlet 38. Any oversize material separated by the screens 34 and 37, is taken through conductor 39 and returned into the line 32, which is the inlet to the crushing rolls.

If desired, the heat curing step carried out by the drier 28 may be accomplished after the material has passed through the rolls crusher 23 instead of prior thereto. In such event, the drier 28 would be located in the dotted line position 28a shown in Figure 2, said drier being mounted in the discharge line 33 extending from the rolls crusher.

As heretofore described, the material passing to the compactor is at a controlled temperature; however, it has been found that an acceptable product may be produced by means of the heat curing of the flake material without regard to whether or not heat has been applied to the material prior to compacting. Thus an improved product may be produced by subjecting the flake material to heat-curing which may be accomplished by passing the flake material through the drier 28 or through a drier positioned at 28a.

It will be evident that the process provides an economical and simple arrangement for converting undesirable fine particles into a granular product. The maintenance of the temperature of the solid-liquid mixture, which is directed to the compactor, assures the proper quality of the sheet or ribbon 18 of material which is produced in the compactor, and this results in a consistently desirably granular product. The use of brine as the moisture adding agent, not only reduces a steam problem which might occur in the paddle mixer 13, but also gives a better bonding action which improves the quality of the sheet material. As indicated in Figure 2, the use of the drier 28 and the screens 30, 34 and 37 are optional.

The foregoing disclosure and description of the invention is illustrative and explanatory thereof and various changes in the size, shape and materials, as well as in the details of the illustrated construction, may be made within the scope of the appended claims without departing from the spirit of the invention.

What I claim is:

1. The method of producing an improved quality of granular muriate of potash which includes, admixing a fine particle feed of muriate of potash with a useful amount of a water base liquid previously saturated with the soluble constituents of the feed to form a solid-liquid mixture, conducting said solid-liquid mixture to a compactor at a temperature of at least 200 degrees F., but less than the fusion temperature of the muriate of potash, compacting the mixture while at a temperature in excess of 200 degrees F. but less than the fusion temperature of the muriate of potash into a sheet of compacted material, thereafter flaking the material, and finally crushing said material to the desired granular size.

2. The method of producing an improved quality of granular muriate of potash which includes, conducting a fine particle of muriate of potash feed to a mixer, adding a useful amount of moisture to said feed by admixing therewith a water base liquid previously saturated with the soluble constituents of the feed in a volume to produce a solid-liquid mixture discharging from the mixer having a moisture content within the range of 0.1 to 2.0%, conducting said solid-liquid mixture to a compactor at a temperature of at least 200 degrees F. but less than the fusion temperature of the muriate of potash, compacting said mixture while at a temperature in excess of 200 degrees F. but less than the fusion temperature of the muriate of potash to form a sheet of compacted material, thereafter flaking said material, and finally crushing said material to the desired granular size.

3. The method as set forth in claim 2, with the additional step of applying heat to the flake prior to the final crushing step.

4. The method as set forth in claim 2, with the additional step of applying heat to the final product after crushing.

5. The method as set forth in claim 2, with the additional step of screening the flake material prior to final crushing to separate extremely fine particles.

6. The method as set forth in claim 2, together with the additional steps of screening the final product after crushing to separate the fine particles, and returning such fine particles to the feed.

7. The method as set forth in claim 2, together with the additional steps of screening the final product after crushing to separate the fine particles, thereafter subjecting the final product to a second screening to separate undesirable coarse particles, and recycling said separated coarse particles through the final crushing step.

8. In a method of producing a granular muriate of potash wherein fine particles of muriate of potash are compacted to form a flake and are thereafter crushed to a desired granular size, the improvement which resides in, preparing the feed to the compactor by adding a useful amount of brine previously saturated with muriate of potash to the feed in a volume to set the moisture content of the solid-liquid mixture within the range of 0.1 to 2.0%, and conducting the solid-liquid mixture to the compacting step at a temperature within the range of 200 degrees F. and 280 degrees F.

9. In a method of producing a granular muriate of potash wherein fine particles of muriate of potash are compacted to form a flake and are thereafter crushed to a desired granular size, the improvement which resides in, preparing the feed to the compactor by adding a useful amount of brine previously saturated with muriate of potash to the feed in a volume to set the moisture content of the solid-liquid mixture within the range of 0.1 to 2.0%, conducting the solid-liquid mixture to the compacting step at a temperature within the range of 200 degrees F. and 280 degrees F., and heat curing the flake prior to final crushing.

References Cited in the file of this patent

UNITED STATES PATENTS

| | | |
|---|---|---|
| 2,107,702 | Hoase | Feb. 8, 1938 |
| 2,195,754 | Robson et al. | Apr. 2, 1940 |
| 2,448,126 | Shoeld | Aug. 31, 1948 |
| 2,461,089 | Smidth | Feb. 8, 1949 |
| 2,463,680 | Corrigan | Mar. 8, 1949 |
| 2,680,680 | Coleman | Dec. 24, 1952 |

OTHER REFERENCES

Chemical Engineering, Agglomeration, October 1951, pages 161–174.